(12) United States Patent
Bates et al.

(10) Patent No.: US 9,009,679 B2
(45) Date of Patent: Apr. 14, 2015

(54) DETERMINING SNAPSHOT PLACEMENT

(75) Inventors: Cary L. Bates, Rochester, MN (US);
Kendrick Wong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/536,643

(22) Filed: Jun. 28, 2012

(65) Prior Publication Data

US 2014/0007058 A1    Jan. 2, 2014

(51) Int. Cl.
*G06Q 40/00* (2012.01)
*G06F 13/00* (2006.01)
*G06F 3/00* (2006.01)
*G06F 9/44* (2006.01)
*G06F 11/36* (2006.01)

(52) U.S. Cl.
CPC .................................. *G06F 11/3624* (2013.01)

(58) Field of Classification Search
CPC . G06F 11/323; G06F 11/366; G06F 11/3466; G06F 11/3604; G06F 11/3636; G06F 11/3664; G06F 8/75; G06F 8/427; G06F 8/433; G06F 11/3409; G06F 11/3438; G06F 11/3476; G06F 11/3495

See application file for complete search history.

(56) References Cited

U.S. PATENT DOCUMENTS

| | | | | |
|---|---|---|---|---|
| 6,434,681 | B1 * | 8/2002 | Armangau | 711/162 |
| 6,745,344 | B1 * | 6/2004 | Joshi et al. | 717/131 |
| 6,795,962 | B1 * | 9/2004 | Hanson | 717/129 |
| 6,901,581 | B1 * | 5/2005 | Schneider | 717/124 |
| 6,931,631 | B2 * | 8/2005 | Bates et al. | 717/129 |
| 8,032,868 | B2 | 10/2011 | Bates et al. | |
| 8,037,454 | B2 | 10/2011 | Bates et al. | |
| 2002/0087950 | A1 * | 7/2002 | Brodeur et al. | 717/124 |
| 2004/0141003 | A1 * | 7/2004 | Nivers et al. | 345/745 |
| 2004/0267548 | A1 * | 12/2004 | Jones | 705/40 |
| 2008/0168428 | A1 * | 7/2008 | Bates et al. | 717/129 |
| 2008/0209351 | A1 * | 8/2008 | Macadaan et al. | 715/762 |
| 2008/0216054 | A1 * | 9/2008 | Bates et al. | 717/125 |
| 2011/0138366 | A1 * | 6/2011 | Wintergerst et al. | 717/130 |

* cited by examiner

*Primary Examiner* — Don Wong
*Assistant Examiner* — Anibal Rivera
(74) *Attorney, Agent, or Firm* — Nicholas D. Bowman; James R. Nock

(57) ABSTRACT

Embodiments of the invention include a method for setting snapshots in code. The method may occur during the debug of code and may include determining whether to place a snapshot instruction immediately before a machine instruction within a module. The determination may include analyzing parameters associated with the machine instruction.

14 Claims, 6 Drawing Sheets

| | | | | | | PERFORMANCE PROFILE DATA — 138 | | |
|---|---|---|---|---|---|---|---|---|
| MODULE ID (316) | LINE (318) | #EXECS (320) | %EXECS (322) | #DEBUG STOPS (324) | %DEBUG STOPS (326) | CREATED (328) | LAST MODIFIED (330) | SNAPSHOT SCORE (332) |
| A | 1 | 7000 | 7 | 20 | 2 | 2005-10-30 F 09:02 | 2010-02-14 T 13:55 | 7 |
| A | 2 | 5000 | 5 | 20 | 2 | 2005-10-30 T 09:02 | 2010-02-14 T 15:11 | 5 |
| A | 3 | 2000 | 2 | 40 | 4 | 2005-10-30 T 10:45 | 2008-04-26 F 07:55 | 2 |
| A | 4 | 1000 | 1 | 70 | 7 | 2006-08-12 T 11:40 | 2006-05-12 T 16:01 | 0 |
| A | 5 | 2000 | 2 | 20 | 2 | 2005-10-30 T 10:45 | 2006-05-04 T 16:20 | 6 |
| A | 6 | 3000 | 3 | 10 | 1 | 2005-10-30 T 10:45 | 2010-03-23 F 09:36 | 4 |
| A | 7 | 3000 | 3 | 20 | 2 | 2005-10-30 T 10:45 | 2011-06-16 T 10:45 | 2 |

SNAPSHOT FLAG DATA

| MODULE ID | LINE | OFFSET | SNAPSHOT FLAG | |
|---|---|---|---|---|
| MODULE A | 1 | 200F | FALSE | 402 |
| MODULE A | 2 | 2800 | FALSE | 404 |
| MODULE A | 3 | 2870 | TRUE | 406 |
| MODULE A | 4 | 2950 | FALSE | 408 |
| MODULE A | 5 | 2980 | FALSE | 410 |
| MODULE A | 6 | 3020 | FALSE | 412 |
| MODULE A | 7 | 3060 | TRUE | 414 |

DETERMINING SNAPSHOT PLACEMENT

TECHNICAL FIELD

The present invention relates to the field of computer systems, and more specifically, to computer systems that execute instructions and a system for debugging such instructions.

BACKGROUND

Computer systems typically include a combination of computer programs and hardware, such as semiconductors, transistors, chips, circuit boards, storage devices, and processors. The computer programs are stored in the storage devices and are executed by the processors. Locating, analyzing, and correcting suspected faults in a computer program is a process known as "debugging." Bugs are problems, faults, or errors in a computer program. Typically, a programmer uses another computer program commonly known as a debugger to debug the program under development.

SUMMARY

Embodiments of the invention include a method for setting snapshots in code. The method may occur during the debug of code and may include determining whether to place a snapshot instruction immediately before a machine instruction within a module. The determination may include analyzing parameters associated with the machine instruction.

Other embodiments of the invention include a method where the determination may include a user specified level of debug. In this embodiment, the method may also include modifying the determinations by analyzing parameters associated with the machine instruction.

BRIEF DESCRIPTION OF THE SEVERAL VIEWS OF THE DRAWINGS

FIG. 3 depicts a block diagram of an example data structure for performance profile data, according to an embodiment of the invention.

FIG. 4 depicts a block diagram of an example data structure for snapshot flag data, according to an embodiment of the invention.

In the drawings and the Detailed Description, like numbers generally refer to like components, parts, steps, and processes.

DETAILED DESCRIPTION

Conventional debuggers typically operate by halting the execution of a program at a particular location, and displaying the program information that is associated with that location to the programmer. By examining this program information during debug, the programmer might eventually find a program location where the associated program information, such as a variable value, is incorrect or unexpected. A useful examination of a halted program requires a snapshot instruction to be placed prior to the halt location or breakpoint. A snapshot instruction is a machine instruction, placed at a particular location, which copies all values of all variables from registers to locations in memory that represent or contain the variables, preserving the values for use in a debug process. At the highest level of debugability, a snapshot may be placed before every line of code within a program. However, as the number of snapshots placed increases the level of performance decreases. This inverse relationship between performance and debugability leaves the programmer with having to determine the most productive placement of snapshots. This creates a need for an automated process to determine the best location for snapshots.

Embodiments of the present invention perform an analysis of a line of code during compilation in order to determine whether a snapshot should be placed before it. This determination may include examining the number of executions of the line of code in proportion to the total executions of the program during a particular session, or over the course of a period of time. The determination may also include examining when the line of code was created and when it was last modified. In addition, the determination may include examining the number of times the program was halted on a particular line during a debugging session, as well as how long the program was halted on the line. The determination may further include the parameters previously mentioned and any other parameters that may be combined to perform a snapshot score calculation. A snapshot score calculation may use a default algorithm or a customized algorithm in order to determine a snapshot score for each line of code. The snapshot score may be compared to a constant and whether the score is greater than or not greater than the constant will determine whether a snapshot is to be placed prior to the line of code. The combination of a calculation of a snapshot score and a comparison of that score to a constant may be referred to as a snapshot score analysis. By only placing snapshots where they are most needed, embodiments of the present invention creates a process that maximizes the level of debugability available to a programmer without unnecessarily sacrificing performance.

Figure 1:
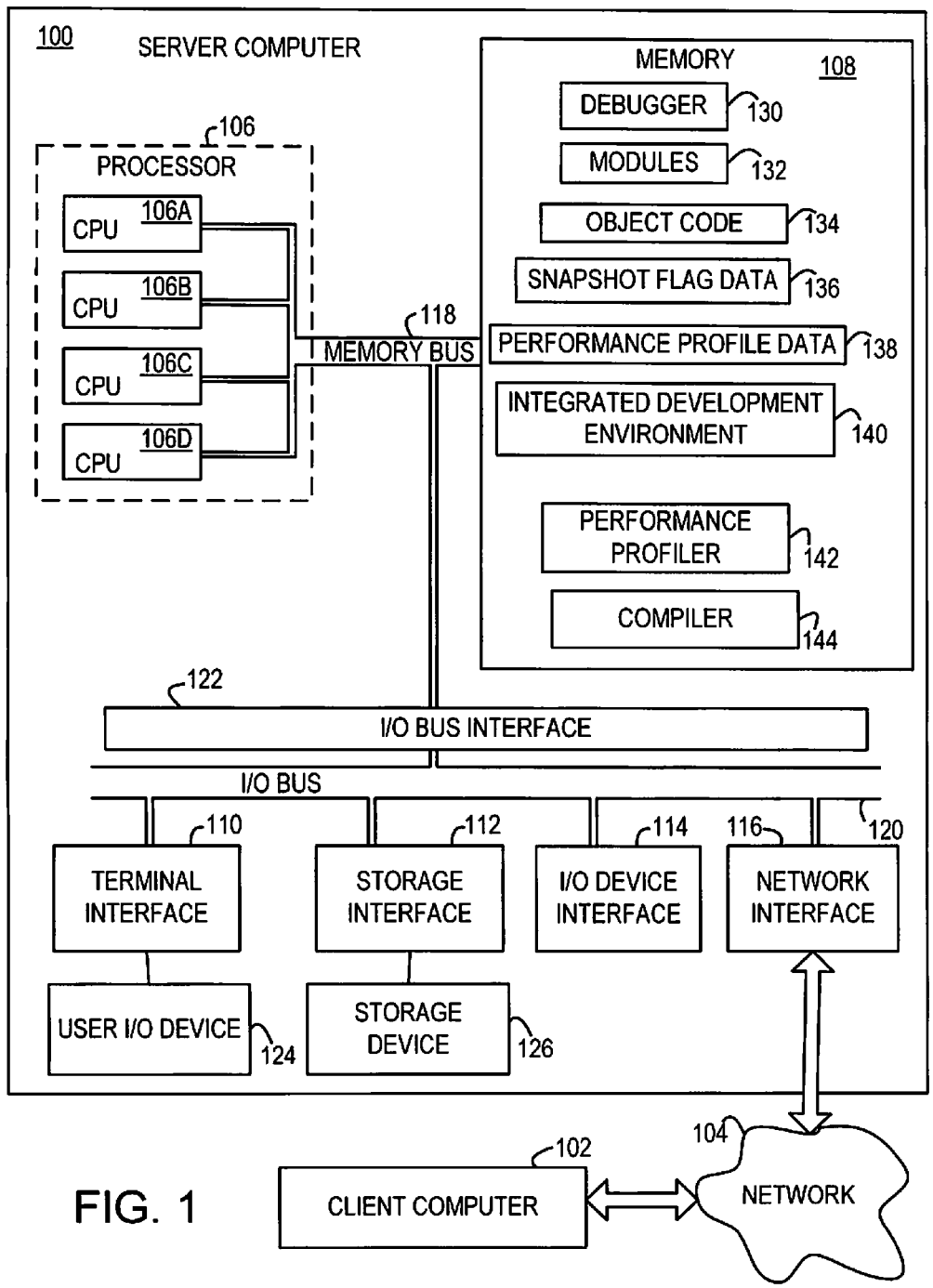
FIG. 1 depicts a high-level block diagram of an exemplary system for implementing an embodiment of the invention.

Referring to the drawings, wherein like numbers denote like parts throughout the several views, FIG. 1 depicts a high-level block diagram representation of a server computer system 100 connected to a client computer system 102 via a network 104, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode a debugger 130, modules 132, object code 134, snapshot flag data 136, performance profile data 138, an integrated development environment (IDE) 140, a performance profiler 142, and a compiler 144. Although the debugger 130, the modules 132, the object code 134, the snapshot flag data 136, the performance profile data 138, the IDE 140, the performance profiler 142, and the compiler 144 are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the debugger 130, the modules 132, the object code 134, the snapshot flag data 136, the performance profile data 138, the IDE 140, the performance profiler 142, and the compiler 144 are illustrated as being contained within the main memory 108, these elements are not necessarily completely contained in the same storage device at the same time. Further, although the debugger 130, the modules 132, the object code 134, the snapshot flag data 136, the performance profile data 138, the IDE 140, the performance profiler 142, and the compiler 144 are illustrated as being separate entities, in other embodiments some of them, portions of some of them, or all of them may be packaged together.

In an embodiment, the debugger 130, the modules 132, the object code 134, the IDE 140, and the compiler 144 may include instructions or statements that execute on the processor 106 or instructions or statements that may be interpreted by instructions or statements that execute on the processor 106, to carry out the functions as further described below with reference to FIGS. 2, 3, 4, 5, 6, and 7. In another embodiment, the debugger 130, the IDE 140, the compiler 144, or two or more of these elements may be implemented in hardware via semiconductor devices, chips, logical gates, circuits, circuit cards, other physical hardware devices, or a combination of these devices in lieu of, or in addition to, a processor-based system. In an embodiment, the debugger 130, the modules 132, the object code 134, the IDE 140, the compiler 144, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices using a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100 to other digital devices and computer systems 102; such paths may include, e.g., one or more networks 104.

Figure 2:
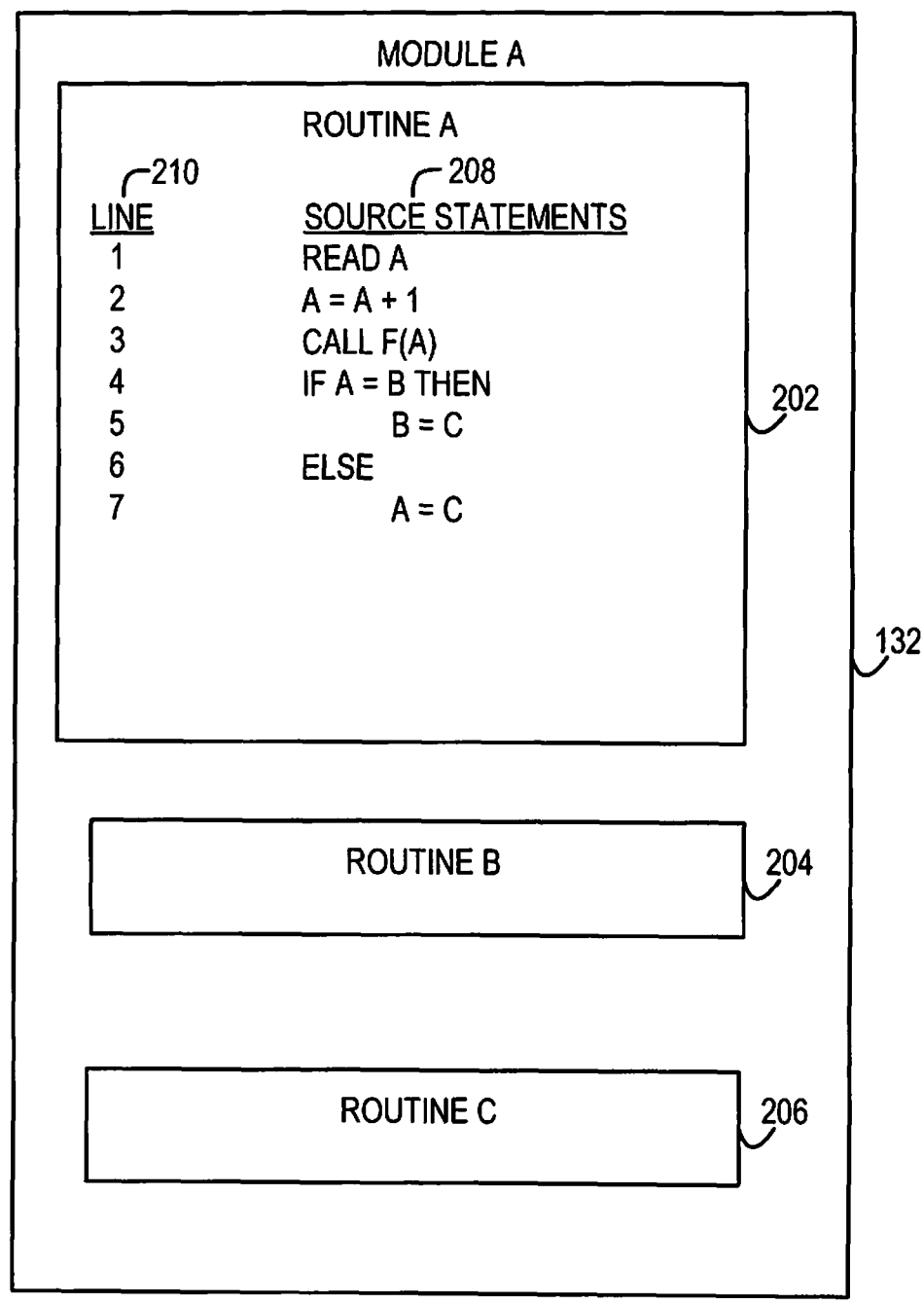
FIG. 2 depicts a block diagram of an example software module, according to an embodiment of the invention.

FIG. 2 depicts a block diagram of an example software module A 132, according to an embodiment of the invention. The module A 132 includes any number of routines, such as a routine A 202, a routine B 204, and a routine C 206. The example routine A 202 includes example source statements 208 and corresponding lines 210 at which the source statements 208 may be stored in the routine 202. Each of the source statements 208 may be identified by its respective line number 210, which may be numbered sequentially from beginning to end of the routine 202 or the module 132. The source statements 208 may be human-readable source code.

The compiler 144 compiles the modules 132, which include source code or statements, into the object code 134, which includes machine instructions that execute on the processor 106. In an embodiment, the compiler 144 may translate the modules 132 into an intermediate form before translating the intermediate form into the object code 134. In an embodiment, the compiler 144 may be a just-in-time compiler that executes as part of an interpreter. In an embodiment, the compiler 144 may be an optimizing compiler. In various embodiments, the compiler 144 may perform peephole optimizations, local optimizations, loop optimizations, inter-procedural or whole-program optimizations, machine code optimizations, or any other optimizations to reduce the amount of time required to execute the object code 134, to reduce the amount of memory required to execute the object code 134, or both. In an embodiment, the optimizations performed by the compiler 144 may result in the values of variables used by the object code 134 being kept in registers and not necessarily immediately stored to memory.

FIG. 3 depicts a block diagram of an example data structure for performance profile data 138, according to an embodiment of the invention. The performance profile data 138 includes example records 302, 304, 306, 308, 310, 312, and 314, each of which includes an example module ID (identifier) field 316, a line number field 318, a number of executions field 320, a percentage of executions field 322, a number of debug stops field 324, a percentage of debug stops field 326, a time created field 328, a time last modified field 330, and a snapshot score field 332.

The module ID field 316 identifies one of the modules 132 and optionally a routine within the module 132. The line number field 318 identifies a line 210 in the module 132 identified by the module identifier field 316. The number of executions field 320 specifies the number of instances the line specified has been executed. The percentage of executions field 322 specifies the number of executions of the line 320 as a percentage of the total line executions of the module. The number of debug stops field 324 specifies the number of instances a debug stop has occurred on the line. For example, a debug stop may be the result of a breakpoint command or a debug stop may be the result of a step during a stepping type debug. The percentage of debug stops field 326 specifies the number of debug stops of the line 326 as a percentage of the total debug stops of the module. The time created field 328 specifies the date and time when the line was created. The time last modified field 330 specifies the date and time that the line was last modified. The snapshot score field specifies the result of a snapshot score calculation. A snapshot score may be calculated from data found in the performance profile data table 138. The calculation of the snapshot score may include a user specified algorithm or it may include a default algorithm. An example of a default algorithm may be that a snapshot score is equal to the percentage of executions of a line 322 less the percentage of debug stops of a line 326 plus the amount of time since the line was last modified 330. The amount of time may be specified in units of days, months, years, or any other suitable unit.

For the calculation of a snapshot score, the percentage of executions of a line 322 may be important because a line of code that executes at a relatively high percentage of the total executions may be a line that may be considered to be relatively stable. This stability may result in a decreased need for debugging of the line and therefore a decreased need for a snapshot to be placed before the line. Further, when a snapshot is placed before a line that executes relatively often, it may have a relatively greater effect on performance, therefore decreasing the desirability of placing a snapshot before the line. In addition, the percentage of debug stops on a line 326 may be important because a line of code that has a relatively high percentage of debug stops relative to the total debug stops may be considered to be a line that requires relatively more attention during the debug process and therefore increasing the desirability of placing a snapshot before the line. Similarly, the amount of time that a programmer spends examining the code at a debug stop may indicate whether it is desirable to place a snapshot before the line. Moreover, the amount of time since the line was last modified 330 may be important because the longer a line of code has remained unchanged, the more stable it may be considered. This stability may result in a decreased need for debugging of the line and therefore a decreased need for a snapshot to be placed before the line.

The fields 320, 322, 324, 326, 328, 330, and 332 may be populated and updated by a performance profiler program 142 or any similar program which monitors program execution. The performance profiler program 142 incrementally changes the values of the fields to reflect the occurrences of events described therein as they occur within the designated machine instruction line. The time period used for determining the values of the fields 320, 322, 324, and 326 may be any suitable time period that would allow the performance profile program 142 to gather an appropriate amount of information. Examples of time periods are the time period from the creation of the line of code 328 to the present, the time period from the last modification of the line of code 330 to the present, the time period from the start of the last debug session to the present, or any other suitable time period. The performance profile data 138 may also be collected during program development, or during a particular debug session. The time created 328 and the time last modified 330 for particular lines may be obtained form the source code.

FIG. 4 depicts a block diagram of an example data structure for snapshot flag data 136, according to an embodiment of the invention. The snapshot flag data 136 includes example records 402, 404, 406, 408, 410, 412, and 414, each of which includes an example module ID (identifier) field 420, a line field 422, an offset field 424, and a snapshot flag field 426. The module ID field 420 identifies one of the modules 132 and optionally a routine within the module 132. The line field 422 identifies a line 210 in the module 132 identified by the module identifier field 420. The offset field 424 specifies the offset (or number of bytes, words, or double words) from the beginning of the object code 134.

The snapshot flag field 426 specifies whether or not snapshot instructions exist in the object code 134 for that record. If the value of the snapshot flag field 426 indicates true, then the snapshot instructions exist, and if execution of the object code 134 halts at the machine instructions at the offset 424, then the values of the variables may be present in the memory 102. If the value of the snapshot flag field 426 indicates false, then the snapshot instructions do not exist, so at the time of execution of the machine instructions at the offset 424, the current values of the variables might be present in the memory 102, or might be present in registers created by the compiler 144 but are not present in the memory 102. Generally, if the snapshot flag field is set to false, relevant variables are not in memory and a programmer is unable to debug code at or near that line.

Figure 5:
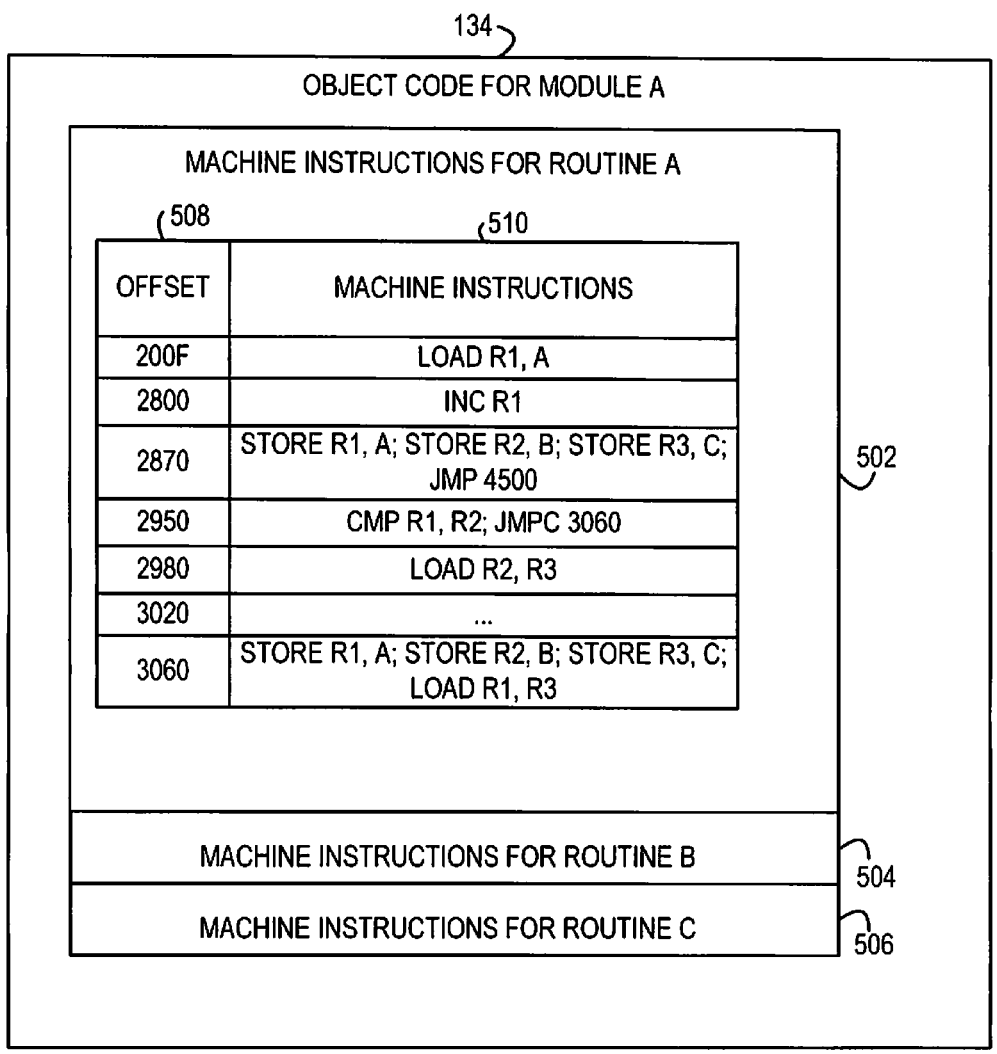
FIG. 5 depicts a block diagram of example object code, according to an embodiment of the invention.

FIG. 5 depicts a block diagram of example object code 134, according to an embodiment of the invention. The object code 134 includes example machine instructions 502 for the routine A 202 of the module A 132, machine instructions 504 for the routine B 204 of the module A 132, and machine instructions 506 for the routine C 206 of the module A 132. The machine instructions 502, when executed on the processor 106, implement the routine A 202 of the module A 132. The machine instructions 504, when executed on the processor 106, implement the routine B 204 of the module A 132. The machine instructions 506, when executed on the processor 106, implement the routine C 206 of the module A 132. For convenience of exposition and ease of understanding, the machine instruction field 510 in FIG. 5 illustrates example assembly language instructions, but the actual machine instructions executed by the processor 106 may be binary codes, in an embodiment. In other embodiments, the processor 106 may execute any appropriate type of machine instructions.

The machine instructions 502 may include any number of entries, each including an offset field 508 and a machine instructions field 510. The offset field 508, in each entry, includes the offset, distance, or amount of storage between the start of the machine instructions 502 (or alternatively the start of the object code 134) and the entry. The debugger 130 maps the lines in the module 132 to the machine instructions in the object code 134.

Thus, for example, "load r1, A" at offset 200F represents the machine instruction that implements line 1 of the module 132 and, when executed, reads the value from the memory location of variable A into register R1. "Store R1, A; Store R2, B; Store R3, C" at offsets 2870 and 3060 represent the machine instructions of the snapshot instructions, which store the values from the registers R1, R2, and R3 to the memory locations that store the respective variables A, B, and C, which may be all of the variables referenced by the example module 132. The snapshot instructions may be immediately before their associated machine instructions, e.g., the "Store R1, A; Store R2, B; Store R3, C" at offset 2870 may be immediately before "JMP 4500" (which implements the source statement "CALL F(A)" at line 3 of the module 132) and immediately after "INC R1" (which implements the source statement "A=A+1" at line 2 of the module 132).

Figure 6:
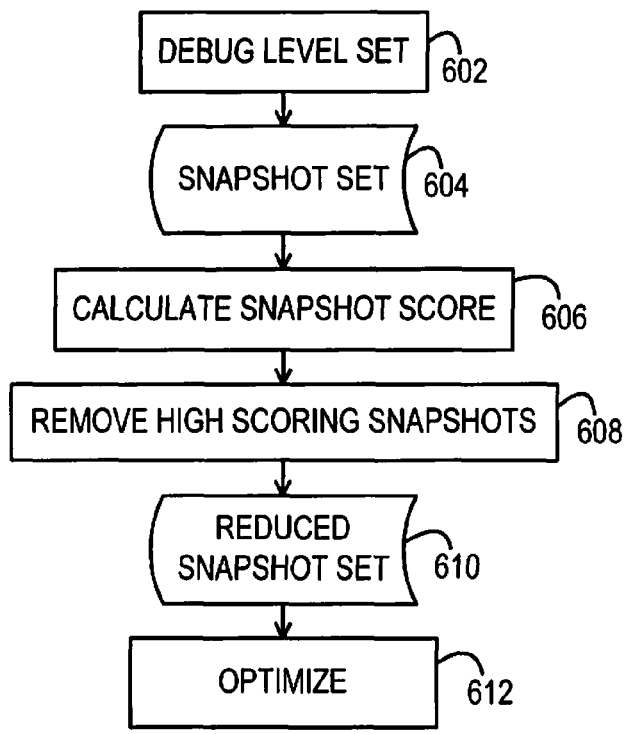
FIG. 6 depicts a block diagram of example process for determining snapshot placement, according to an embodiment of the invention.

FIG. 6 depicts a block diagram of an example process for determining snapshot placement, according to an embodiment of the invention. At block 602, a compiler 144 may receive a command from a user which specifies a level of debug. As an example, the user may have the options of a high debug level and a low debug level. However, in other embodiments, the number of debug level options available to the user may be greater, with unique specifications of snapshot placement associated with each level of debug. As an example, if the user chooses a high debug level, the compiler 144 inserts snapshot instructions before the machine instructions that implement every line of the module 132 and updates the snapshot flag data 136 to indicate that the snapshot flag 426 is true for every line in the module 132. Also, by way of example, if the user chooses a low debug level, the compiler 144 inserts snapshot instructions immediately prior to those machine instructions in the object code 134 that implement control flow statements, but not immediately prior to any other machine instructions.

At block 604, a result from the process of block 602 is a set of snapshots. At block 606, a snapshot score 332 is calculated for each line which has a snapshot placed before it. The snapshot score 332 may be calculated using one or more parameters associated with that line of code. The one or more parameters may be parameters from the data found in the performance profile data table 138. The snapshot score calculation may include a user specified algorithm or it may include a default algorithm. An example of a default algorithm may be a snapshot score is equal to the percentage of executions of a line 322 less the percentage of debug stops of a line 326 plus the amount of time since the line was last modified 330. In other embodiments, the snapshot score calculation may be performed using the performance profile data 138 values from multiple lines surrounding the machine instruction. For example, the snapshot score calculation may also use the values of the performance profile data table 138 for the four lines preceding and following the machine instruction.

At block 608, the snapshot scores may be compared to a value of a constant. The value of the constant may be a default value or it may be set by a user. For example, the constant value may be five. If the snapshot score is not greater than the constant, the corresponding snapshot is not removed. For example, referring to FIG. 3, the values of the snapshot score for records 304, 306, 308, 312, and 314 are not greater than five, therefore had a snapshot been placed prior to any of these lines, it would not have been removed. If the snapshot score is greater than the constant, the corresponding snapshot is removed. For example, the values of the snapshot score for records 302 and 310 are greater than five, therefore had a snapshot been placed prior to either of these lines, it would be removed. A calculation of a snapshot score and a comparison of that score to a constant may be referred to as a snapshot score analysis.

At block 610, a result from the process of block 608 is a reduced set of snapshots. At block 612 the compiler may optimize the module 132.

Figure 7:
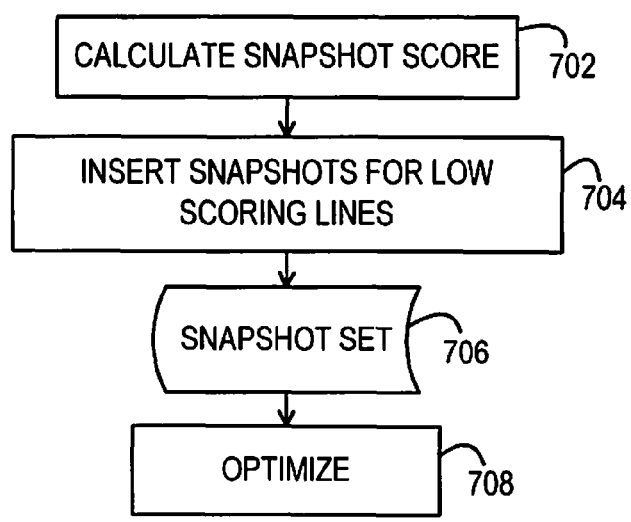
FIG. 7 depicts a block diagram of example process for determining snapshot placement, according to an embodiment of the invention.

FIG. 7 depicts a block diagram of example process for determining snapshot placement, according to an embodiment of the invention. At block 702 a snapshot score is calculated for every line of code using one or more parameters associated with that line. The snapshot score may be determined in the same manner as described with respect to operation 606.

At block 704, the snapshot scores may be compared to the value of a constant. The value of the constant may be a default value or it may be set by a user. For example, the constant value may be five. If the snapshot score is not greater than the constant, a snapshot is placed prior to the corresponding line. For example, referring to FIG. 3, the values of the snapshot score for records 304, 306, 308, 312, and 314 are not greater than five, therefore a snapshot is placed prior to these lines. If the snapshot score is greater than the constant, a snapshot is not placed prior to the corresponding line. For example, the values of the snapshot score for records 302 and 310 are greater than five, therefore a snapshot is not placed prior to these lines. A calculation of a snapshot score and a comparison of that score to a constant may be referred to as a snapshot score analysis.

At block 706, a result from the process of block 704 is a set of snapshots. At block 708 the compiler may optimize the module 132.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 102 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method comprising:
   collecting performance profile data about a machine instruction located within a module, the performance profile data including parameters associated with the machine instruction;
   analyzing the parameters associated with the machine instruction;
   based on the analysis and during a compile of the module, determining to place a snapshot instruction immediately before the machine instruction within the module;
   based on the determination, placing the snapshot instruction immediately before the machine instruction within the module;
   subsequent to the placement, executing the module; and
   during the execution of the module, storing, in a memory, values of variables associated with the module when the snapshot instruction is executed.

2. The method of claim 1, wherein the parameters associated with the machine instruction include the machine instruction's execution as a proportion of the executions of the module as a whole.

3. The method of claim 1, wherein the parameters associated with the machine instruction include a time relationship.

4. The method of claim 3, wherein the time relationship includes a relationship of time since the machine instruction's creation.

5. The method of claim 3, wherein the time relationship includes a relationship of time since the machine instruction's most recent modification.

6. The method of claim 1, wherein analyzing the parameters includes a snapshot score analysis.

7. The method of claim 1, wherein the parameters associated with the machine instruction include the number of times the module was halted on the machine instruction during a debugging session.

8. The method of claim 6, wherein the snapshot score analysis includes calculating a snapshot score using at least two items selected from the group consisting of the machine instruction's execution as a proportion of the executions of the module as a whole, a relationship of time since the machine instruction's creation, and a relationship of time since the machine instruction's most recent modification.

9. A computer readable storage medium, which is not a transitory signal per se, having instructions stored thereon which, when executed, cause a processor to perform the following operations:
   collecting performance profile data about a machine instruction located within a module, the performance profile data including parameters associated with the machine instruction;
   analyzing the parameters associated with the machine instruction;
   based on the analysis and during a compile of the module, determining to place a snapshot instruction immediately before the machine instruction within the module;
   based on the determination, placing the snapshot instruction immediately before the machine instruction within the module;
   subsequent to the placement, executing the module; and
   during the execution of the module, storing, in a memory, values of variables associated with the module when the snapshot instruction is executed.

10. The storage medium of claim 9, wherein the parameters associated with the machine instruction include the machine instruction's execution as a proportion of the executions of the module as a whole.

11. The storage medium of claim 9, wherein the parameters associated with the machine instruction include a time relationship.

12. The storage medium of claim 11, wherein the time relationship includes a relationship of time since the machine instruction's creation.

13. The storage medium of claim 11, wherein the time relationship includes a relationship of time since the machine instruction's most recent modification.

14. The storage medium of claim 9, wherein the analyzing the parameters and the determining to place are both performed in an automated manner.

* * * * *